United States Patent [19]

Borovski et al.

[11] Patent Number: 4,763,247

[45] Date of Patent: Aug. 9, 1988

[54] MULTIPROCESSOR SYSTEM FORMED BY MICROPROCESSOR MATRIX

[75] Inventors: Boris H. Borovski; Plamenka I. Ilieva, both of Sofia, Bulgaria

[73] Assignee: Vmei "Lenin", Sofia, Bulgaria

[21] Appl. No.: 812,252

[22] Filed: Dec. 23, 1985

[30] Foreign Application Priority Data

Dec. 26, 1984 [BG] Bulgaria .................................. 68107
Oct. 15, 1985 [BG] Bulgaria .................................. 72032

[51] Int. Cl.$^4$ .......................... G06F 15/16; G06F 15/56
[52] U.S. Cl. ......................................... 364/200; 370/60
[58] Field of Search ... 364/200 MS File, 900 MS File; 370/60

[56] References Cited

U.S. PATENT DOCUMENTS

| | | | |
|---|---|---|---|
| 4,031,512 | 6/1977 | Faber .................................. | 364/200 |
| 4,393,497 | 7/1983 | Cantwell, Jr. ........................ | 370/89 |
| 4,577,308 | 3/1986 | Larson et al. ......................... | 370/9 |
| 4,596,010 | 6/1986 | Beckner et al. ....................... | 370/60 |
| 4,627,048 | 12/1986 | Larson .................................. | 370/60 |
| 4,670,871 | 6/1987 | Vaidya .................................. | 370/60 |

OTHER PUBLICATIONS

Loop-Structured Switching Network, IEEE Transactions on Computers, C-33, 5, pp. 450-455; 1984.

Primary Examiner—Gareth D. Shaw
Assistant Examiner—Maria Napiorkowski
Attorney, Agent, or Firm—Herbert Dubno

[57] ABSTRACT

A multiprocessor system in which the base module comprises 32 microcomputer modules and provides a possibility for expansion. The interprocessor exchange is realized by a four-stage interconnection network with cyclic structure, which comprises 16 communication nodes. To each communication node there are connected two microcomputer modules and its structure comprises multiplexers, priority logics, input buffers, commutator elements, local controllers, demultiplexers, address registers and digital comparators. The self-synchronizing interconnection network provides spiral routes for eliminating any deadlock, as well as their reservation, which determines the high reliability and good possibilities for fault-tolerance.

4 Claims, 4 Drawing Sheets

MULTIPROCESSOR SYSTEM FORMED BY MICROPROCESSOR MATRIX

FIELD OF THE INVENTION

This invention relates to a multiprocessor system which can be used in computer engineering for the construction of high performance computers.

BACKGROUND OF THE INVENTION

A known multiprocessor system (Wong, F. S. and ITO, M. R.: A Loop-Structured Switching Network, IEEE Transactions on Computers, C-33, 5, pp 450–455; 1984) is built up of 64 standard microprocessor modules in which the interprocessor exchange is realized by a cyclic four-stage interconnection network, where each stage comprises eight communication nodes and to each node there are connected two processor elements.

The communication connections between the first and the second stage are distributed in four groups, and each group comprises two adjacent communication nodes of the first stage and two adjacent communication nodes of the second stage.

Within one group, the first output of the first communication node of the first stage is connected to the first input of the first communication node of the second stage, the second output of the first communication node of the first stage is connected to the first input of the first communication node of the second stage, the second output of the first communication node of the first stage is connected to the first input of the second communication node of the second stage, the first output of the second communication node of the first stage is connected to the second input of the first communication node of the second stage, the second output of the second communication node of the first stage is connected to the second input of the second communication node of the second stage.

The communication connections between the second and the third stage are separated in two groups, and each group comprises four adjacent communication nodes of the second stage and four adjacent communication nodes of the third stage. Within each group, the first output of the first communication node of the second stage is connected to the first input of the first communication node of the third stage, the second output of the first communication node of the second stage is connected to the first input of the third communication node of the third stage, the first output of the second communication node of the second stage is connected to the first input of the second communication node of the third stage, the second output of the second communication node of the second stage is connected to the first input of the fourth communication node of the third stage.

The first output of the third communication node of the second stage is connected to the second input of the first communication node of third stage, the second output of the third communication node of the second stage is connected to the second input of the third communication node of the third stage.

The first output of the fourth communication node of the second stage within one group is connected to the second input of the second communication node of the third stage, the second output of the fourth communication node of the second stage is connected to the second input of the fourth communication node of the third stage.

The outputs of the communication nodes of the third stage are distributed in two groups, and each group comprises the outputs of four adjacent communication nodes of the third stage.

The inputs of the communication nodes of the fourth stage are distributed in two groups, and each group comprises the inputs of four adjacent communication nodes of the fourth stage.

The first outputs of the communication nodes of the third stage of the first group are connected respectively to the first inputs of the communication nodes of the fourth stage of the first group.

The second outputs of the communication nodes of the third stage of the first group are connected respectively to the first inputs of the communications nodes of the fourth stage of the second group.

The first outputs of the communication nodes of the second group of the third stage are connected respectively to the second inputs of the communication nodes of the first group of the fourth stage.

The second outputs of the communication nodes of the second group of the third stage are connected respectively to the second inputs of the communication nodes of the second group of the fourth stage.

The communication nodes of the first stage are distributed in two groups, and each group comprises four adjacent communication nodes. The first outputs of the communication nodes of the fourth stage are connected respectively to the inputs of the communication nodes of the first group in a first stage, the second outputs of the communication nodes of the fourth stage are connected respectively to the inputs of the communication nodes of the second group in the first stage.

Each communication node comprises six input buffers which are distributed uniformly in two groups, and the output of each of the two input ports is connected to the inputs of the three buffers of one group, as well as four intermediate ports, distributed uniformly in two groups.

The outputs of the first buffers of both groups are connected respectively to the first and the second output port. The outputs of the second buffers of both groups are connected to the input of the first intermediate port of the first group and the input of the second intermediate port of the second group. The outputs of the third buffers of the first and the second group are connected in parallel to the inputs of the second intermediate port of the first group and the first intermediate port of the second group.

The outputs of both intermediate ports of the first group are connected to the input of the first output port; the outputs of both intermediate ports of the second group are connected to the input of the second output port.

The communication between the processor elements is realized by the exchange of messages by means of commutation of packets.

The regulation of the traffic in the interconnection network is based on priority discipline in three levels, and when the packets pass via the communication connections between the fourth and the first stage their priority is increased by one. The first input buffers of the first and second group comprise packets with priority 2, the second input buffers of both groups comprise packets with priority 1, the third input buffers of both groups comprise packets with zero priority.

In the routine of the packet from the source to the destination, the packet is commutated through the communication nodes in the different stages, and the following operations are realized.

(a) when the packet passes through the input port of the communication node, it is loaded in one of the three input buffers depending on its priority;

(b) the packets with priority 2 are commutated by the first input buffer of each group directly to the respective output port;

(c) the packets with priority 0 or 1 are commutated first by the input buffers to the respective intermediate ports, and then to the respective output port;

(d) in the output port there is effected a comparison of the destination address of the packet with the address of the adjacent processor module; and (e) in the case of coincidence of addresses, the packet is transmitted to the adjacent processor module, or else it is routed to the next-following stage of the interconnection network.

A drawback of this multiprocessor system lies in the complex hardware at the communication nodes, the low adaptibility for implementation in VLSI sysems, the complex priority discipline of the packets in the regulation of the traffic in the network, the low coefficient of hardware utilization in the interconnection network, the low reliability, the lack of a possibility for fault-tolerance and modular expansion of the system.

OBJECT OF THE INVENTION

It is therefore an object of the invention to provide a multiprocessor system with an efficient and economically expedient interconnection network on the basis of simple hardware for the communication nodes, with a simple priority discipline of the packets for regulating the traffic in the network and avoidance of deadlock, with an efficient hardware utilization of the communication resources, with good adaptability for implementation in VLSI systems, and with a high reliability and the possibility for fault-tolerance and modular expansion of the system.

SUMMARY OF THE INVENTION

This object is achieved by a multiprocessor system, which is a matrix of 32 standard microcomputer modules. The interprocessor exchange is realized by an interconnection network of a cyclic structure, which comprises 16 communication nodes, distributed uniformly in four stages. Each communication node comprises two inputs of ports, each of which comprises a data bus and respective control lines for request and grant of the preceding stage and two outputs or ports, each of which comprises a data bus and respective control lines for request and grant to the next-following stage.

The first output of the first communication node of the first stage of the interconnection network is connected to the first input of the first communication node of the second stage; the second output of the first communication node of the first stage is connected to the first input of the third communication node of the second stage; the first output of the second communication node of the first stage is connected to the second input of the first communication node of the second stage; the second output of the second communication node of the first stage is connected to the second input of the third communication node of the second stage; the first output of the third communication node of the first stage is connected to the first input of the second communication node of the second stage; the second output of the second communication node of the first stage is connected to the first input of the fourth communication node of the second stage; the first output of the fourth communication node of the first stage is connected to the second input of the second communication node of the second stage; and the second output of the fourth communication node of the first stage is connected to the second input of the fourth communication node of the second stage.

The communication connections between the second and the third stage are identical to the communication connections between the first and the second stage.

The outputs of the communication nodes of the third stage are distributed uniformly in two groups. The outputs of the communication nodes of the first group are connected respectively to the first inputs of the communication nodes of the fourth stage, the outputs of the communication nodes of the second group are connected respectively to the second inputs of the communication nodes of the fourth stage.

The communication connections between the fourth and the first stage are identical to the communication connections between the third and the fourth stage.

Each connection between the communication nodes is a bus comprising data and control lines. To each communication node in the network there are connected two microcomputer modules via direct memory access controllers, the synchronization inputs of which are connected to the network clock generator.

Each communication node comprises two identical multiplexers, first data inputs of which are connected respectively to the data buses of both inputs of the communication node and second data inputs of which are connected via buffers to the data buses of the respective direct memory access controllers of the adjacent microcomputer modules.

The communication node comprises a priority logic, the high-priority input of which is connected to the request control line of the preceding stage of the first input of the communication node; the low-priority input of the priority logic is connected to the request output of the first direct-memory-access controller; a resetting input of the priority logic is connected to the output for end of receiving of the first input buffer of the local controller, a synchronizing input of the priority logic is connected to the network clock generator; an enable input of the priority logic is connected via an OR gate to the data output of the first input buffer; an enable output for high-priority of the priority logic is connected to the grant control line to the preceding stage of the first input of the communication node; the low-priority grant output of the priority logic is connected to the grant input of the first direct-memory-access controller; and the control output of the priority logic is connected to the input of the local controller for start-of-receiving in the first input buffer.

The communication node comprises a second priority logic which is identical to the first. Its high-priority input is connected to the request control line of the preceding stage of the second input of the communication node, its low-priority input is connected to the request output of the second direct-memory-access controller, its resetting input is connected to the output for end-of-receiving in the second input buffer of the local controller, its synchronizing input is connected to the network clock generator, its enable input is connected via an OR gate to the data output of the second input buffer, its enable output for high priority is connected to the grant control line to the precedent stage of the second input of the communication node, its grant output for low priority is connected to the grant input of the second direct-memory-access controller, its control output is connected to the input of the local controller for start-of-receiving in the second input buffer.

The communication node comprises an input buffer which is a stack built-up of "master-slave" D-flip-flops, the synchronizing inputs of which are connected in parallel and represent the synchronizing input of the input buffer, which is connected to the synchronization output of the first input buffer of the local controller.

The data input of the input buffer is connected to the output of the first multiplexer; the data output of the input buffer is connected to the inputs of two digital comparators, to the first data input of the commutator and via an OR gate to the input of the local controller for empty first buffer, and the most significant-digit of its output register is connected to the input of the local request controller of the first input buffer.

The communication node comprises a second input buffer which is identical to the first, but differing from it in that its synchronizing input is connected to the output of the local synchronization controller of the second input buffer, its data input is connected to the output of the second multiplexer, while its data output is connected to the inputs of the third and the fourth digital comparators, to the second data input of the commutator and via an OR gate to the input of the local controller for empty second buffer, and the most-significant digit of its output register is connected to the input of the local request controller of the second input buffer.

The communication node comprises an address register, the output of which is connected to the second inputs of the first and the third digital comparators and a second address register, the output of which is connected to the second inputs of the second and the fourth digital comparators.

The outputs of the four digital comparators are connected respectively to the four inputs of the local controller for coincidence of the destination address. Both control inputs of the commutator are connected respectively to both control outputs of the local controller for dynamic reconfiguration.

The first data output of the commutator is connected to the data input of a demultiplexer, the address input of which is connected to the output of the local controller for grant of transmission to the first adjacent microcomputer module.

The first data output of the demultiplexer is connected to the data bus of the first output of the communication node, and its second data output is connected via a buffer to the data bus of the first direct-memory-access controller.

The second data output of the commutator is connected to the data input of a second demultiplexer, the address input of which is connected to the output of the local controller for grant of transmission to the second adjacent microcomputer module.

The first data output of the second demultiplexer is connected to the data bus of the second output of the communication node, while its second data output is connected via a buffer to the data bus of the second direct-memory-access controller.

The priority logic comprises a D-flip-flop, the reset input of which represents its resetting input. The synchronizing input of the D-flip-flop is connected via an AND gate to the synchronizing input of the priority logic and the inverse output of the flip-flop, while its data input is connected via an AND gate to the low-priority input of the priority logic, and the second input of the AND gate is connected via an inverter to the high-priority input of the priority logic.

The direct and the inverse outputs of the D-flip-flop are connected respectively via an AND gate, the second inputs of which are connected to the grant input of the priority logic, to the grant outputs of the priority logic for low- and high-priority and also to the inputs of AND gates, the second inputs of which are connected respectively to the low-priority and high-priority inputs of the priority logic. The outputs of the AND gates are connected via an OR gate to the control output of the priority logic.

The communication node comprises a local controller, the input of which for an empty first buffer is connected via a differentiating circuit and an inverter to a monostable multivibrator, and the output of which is connected to the resetting inputs of the first three D-flip-flops of the local controller and also the first inputs of the seventh and eighth AND gates.

The output of the first differentiating circuit is also connected to a second monostable multivibrator, the output of which is connected to the output of the local controller for end-of-receiving in the first input buffer, and also via a second inverter to the setting input of the first D-flip-flop.

The output of the second inverter is connected via a delay element to the synchronizing inputs of the second and the third D-flip-flops.

The input of the local controller for an empty second buffer is connected via a second differentiating circuit and a third inverter to the input of a third monostable multivibrator, and the output of which is connected to the resetting inputs of the fifth, the sixth and the seventh D-flip-flops in the local controller and also the first inputs of a ninth and a tenth AND gates.

The output of the second differentiating circuit is also connected to a fourth monostable multivibrator, the output of which is connected to the output of the local controller for end of receiving in the second input buffer and also via a fourth inverter to the setting input or the seventh D-flip-flop. The output of the fourth inverter is connected also via a second delay element to the synchronizing inputs of a fifth and a sixth D-flip-flops.

The data input of the fourth D-flip-flop is connected to the input of the local request controller of the first input buffer, while the data input of the eighth D-flip-flop is connected to the input of the local request controller of the second input buffer.

The direct output of the first D-flip-flop is connected in parallel with the first inputs of the eleventh and the twelfth AND gates, to the second inputs of which there are connected respectively the inverse and the direct outputs of the fourth D-flip-flop.

The output of the eleventh AND gate is connected to the first inputs of the thirteenth and the fourteenth AND gates, and the second input of the thirteenth AND gate is connected via a fifth inverter to the first input of the local controller for coincidence with the destination address and its output is connected to the data input of the second D-flip-flop.

The output of the twelfth AND gate is connected to the first inputs of the fifteenth and the sixteenth AND gates, to the first input of the fourth OR gate and also to the first input of the seventeenth AND gate, the second input of which is connected via a sixth inverter to the second input of the local controller for coincidence with the destination address and the output of which is connected to the data input of the third D-flip-flop.

The direct output of the seventh D-flip-flop is connected to the first inputs of the eighteenth and the nineteenth AND gates, the second inputs of which are connected respectively to the inverse and direct outputs of the eighth D-flip-flop, while the output of the eighteenth AND gate is connected via a twentieth AND gate to the data input of the fifth D-flip-flop, and the second input of the twentieth AND gate is connected via a seventh inverter to the third input of the local controller for coincidence with the destination address. The output of the eighteenth AND gate is also connected to the first inputs of the twentyfirst and twentysecond AND gates and to the first input of a fifth OR gate, the second input of which is connected to the inverse output of the seventh D-flip-flop and the output of which is connected via the second input of the sixteenth AND gate and the eighth inverter to the data input of the ninth D-flip-flop.

The output of the nineteenth AND gate is connected to the first inputs of the twentythird and the twentyfourth AND gates, while the second input of the latter is connected via a ninth inverter to the fourth input of the local controller for coincidence of the destination address and its output is connected to the data input of the sixth D-flip-flop.

The direct outputs of the second and the fifth D-flip-flops are combined in a sixth OR gate, the output of which is connected to the output of the local controller for grant of transmission to the first adjacent microcomputer module and also to the second input of the seventh OR gate, the first input of which is connected to the input of the local controller for grant of transmission from the first output of the communication node to the next-following stage, and the output of the seventh OR gate is connected to the data input of the tenth D-flip-flop.

The output of the sixth OR gate is connected also via a tenth inverter to the second inputs of the fourteenth and the twentyfirst AND gates.

The direct outputs of the third and the sixth D-flip-flops are combined in an eighth OR gate, the output of which is connected to the output of the local controller for grant of transmission to the second adjacent microcomputer module and also to the second input of the ninth OR gate, the first input of which is connected to the input of the local controller for grant of transmission from the second output of the communication node to the next-following stage and the output of which is connected to the information input of the eleventh D-flip-flop.

The output of the eighth OR gate is also connected via an eleventh inverter to the second inputs of the fifteenth and the twentythird AND gates, the outputs of which are combined in a tenth OR gate whose output is connected to the second output of the local controller for request to the next-following stage.

The third inputs of the fourteenth and the fifteenth AND gates are connected to the input of the local controller for empty first buffer, while the third inputs of the twentyfirst and the twentythird AND gates are connected to the input of the local controller for an empty second buffer.

The outputs of the fourteenth and the twentyfirst AND gates are combined in an eleventh OR gate, the output of which is connected to the first output of the local controller for request to the next-following stage. The synchronizing inputs of the tenth and the twelfth D-flip-flops are connected via a twentyfourth AND gate to the network clock generator and the inverse output of the tenth D-flip-flop.

The synchronizing inputs of the ninth and the eleventh D-flip-flops are connected via a twentyfifth AND gate to the network clock generator and the inverse output of the eleventh D-flip-flop. The direct output of the eleventh D-flip-flop is connected to the inputs of the twentysixth and the twentyseventh AND gates.

The inverse output of the twelfth D-flip-flop is connected to the input of the twentyeighth AND gate and to the second input of the seventh AND gate, the output of which is combined with the output of the ninth AND gate into a NOR gate, the output of which is connected to the reset input of the tenth D-flip-flop.

The inverse output of the ninth D-flip-flop is connected to the second input of the twentysixth AND gate and also to the second input of the eighth AND gate, the output of which is combined with the output of the tenth AND gate into a second NOR gate, the output of which is connected to the reset input of the eleventh D-flip-flop.

The direct output of the twelfth D-flip-flop is connected to the second inputs of the ninth and the twentyninth AND gates and is also connected to the first output of the local controller for dynamic reconfiguration.

The direct output of the ninth D-flip-flop is connected to the second inputs of the tenth and the twentyseventh AND gates and also to the second output of the local controller for dynamic reconfiguration. The first inputs of the twentyeighth and the twentyninth AND gates are connected to the direct output of the tenth D-flip-flop.

The outputs of the twentyeighth and the twentysixth AND gates are combined together with the input of the local controller for start of receiving in the first input buffer into a twelfth OR gate, the output of which is connected via a thirteenth AND gate to the output of the local controller for synchronization of the first input buffer.

The outputs of the twentyseventh and the twentyninth AND gates are combined together with the input of the local controller for start-of-receiving in the second input buffer into a thirteenth OR gate, which is connected via the thirtyfirst AND gate to the output of the local controller for synchronization of the second input buffer.

The second inputs of the thirtieth and the thirtyfirst AND gates are connected to the network clock generator.

The inverse output of the first D-flip-flop is connected to the input of the fourth OR gate, the output of which is connected via the twentysecond AND gate to the data input of the twelfth D-flip-flop.

The outputs of the second and the fourth monostable multivibrators are connected respectively via a third and a fourth delay elements to the synchronizing inputs of the fourth and the eighth D-flip-flop.

The advantages of the multiprocessor system according to the invention lie in the simple hardware realization of the communication nodes, the good adaptability for implementation in VLSI systems, the simple priority discipline of the packets for regulating the traffic in the interconnection network and the avoidance of deadlock, the high efficiency of hardware utilization in the network, the high reliability, the reservation of routes, which determine good possibilities for fault-tolerance, the possibility for modular expansion of the system.

BRIEF DESCRIPTION OF THE DRAWING

For a better understanding of the invention reference should be made to the accompanying drawing which illustrates an embodiment of the invention.

In the drawing.

Specific Description

Figure 1:
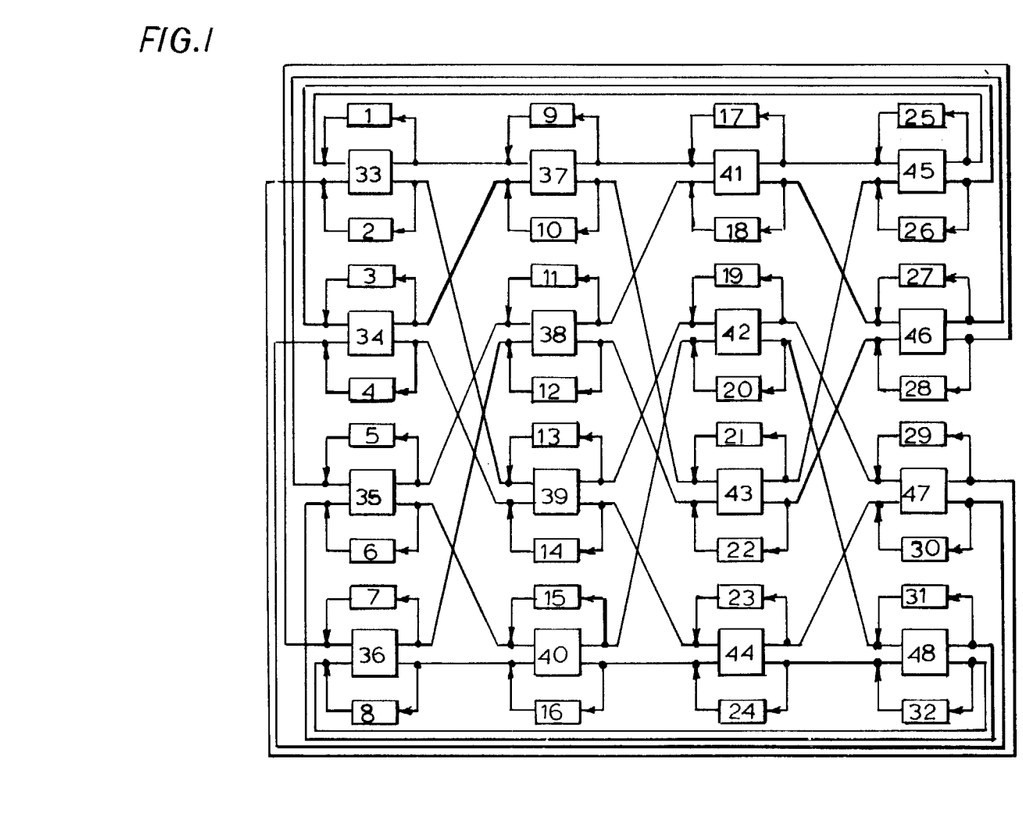
FIG. 1 is a block diagram of the multiprocessor system.

The multiprocessor system according to the invention comprises a matrix of 32 standard microcomputer modules 1 to 32, the interprocessor exchange between which is realized by an interconnection network of cyclic structure, comprising 16 communication nodes 33 to 48 distributed uniformly in four stages. Each communication node comprises two inputs, each of which comprises a data bus IN0 and IN1 and respective control lines for request and for grant of the previous stage $REQ_{IN}$ and $GRANT_{IN}$, and two outputs each of which comprises data bus OUT0 and OUT1 and respective control lines for request and for grant of the next-following stage $REQ_{OUT}$ and $GRANT_{OUT}$.

The first output of the first communication node of the first stage of the interconnection network 33 is connected to the first input of the first communication node of the second stage 37, the second output of the first communication node of the first stage 33 is connected to the first input of the third communication node of the second stage 39, the first output of the second communication node of the first stage 34 is connected to the second input of the first communication node of the second stage 37, the second output of the second communication node of the first stae 34 is connected to the second input of the third communication node of the second stage 39, the first output of the third communication node of the first stage 34 is connected to the first input of the second communication node of the second stage 38, the second output of the third communication node of the first stage 35 is connected to the first input of the fourth communication node of the second stage.

The first output of the fourth communication node of the first stage 36 is connected to the second input of the second communication node of the second stage 38, the second output of the fourth communication node of the first stage 36 is connected to the second input of the fourth communication node of the second stage 40. The communication connections between the second and the third stage are identical to the communication connections between the first and the second stage.

The outputs of the communication nodes of the third stage are distributed uniformly in two groups. The outputs of the communication nodes of the first group 41 and 42 are connected respectively to the first inputs of the communication nodes of the fourth stage 43, 46, 47, 48, the outputs of the communication nodes of the second group 43 and 44 are connected respectively to the second inputs of the communication nodes of the fourth stage.

The communication connections between the fourth and the first stage are identical to the communication connections between the third and the fourth stage.

Each connection between the communication nodes is a bus which comprises data and control lines. To each communication node in the network there are connected two microcomputer modules via direct memory access controllers 49 and 50, the synchronization inputs of which are connected to the clock generator of the intercommunication network.

Figure 2:
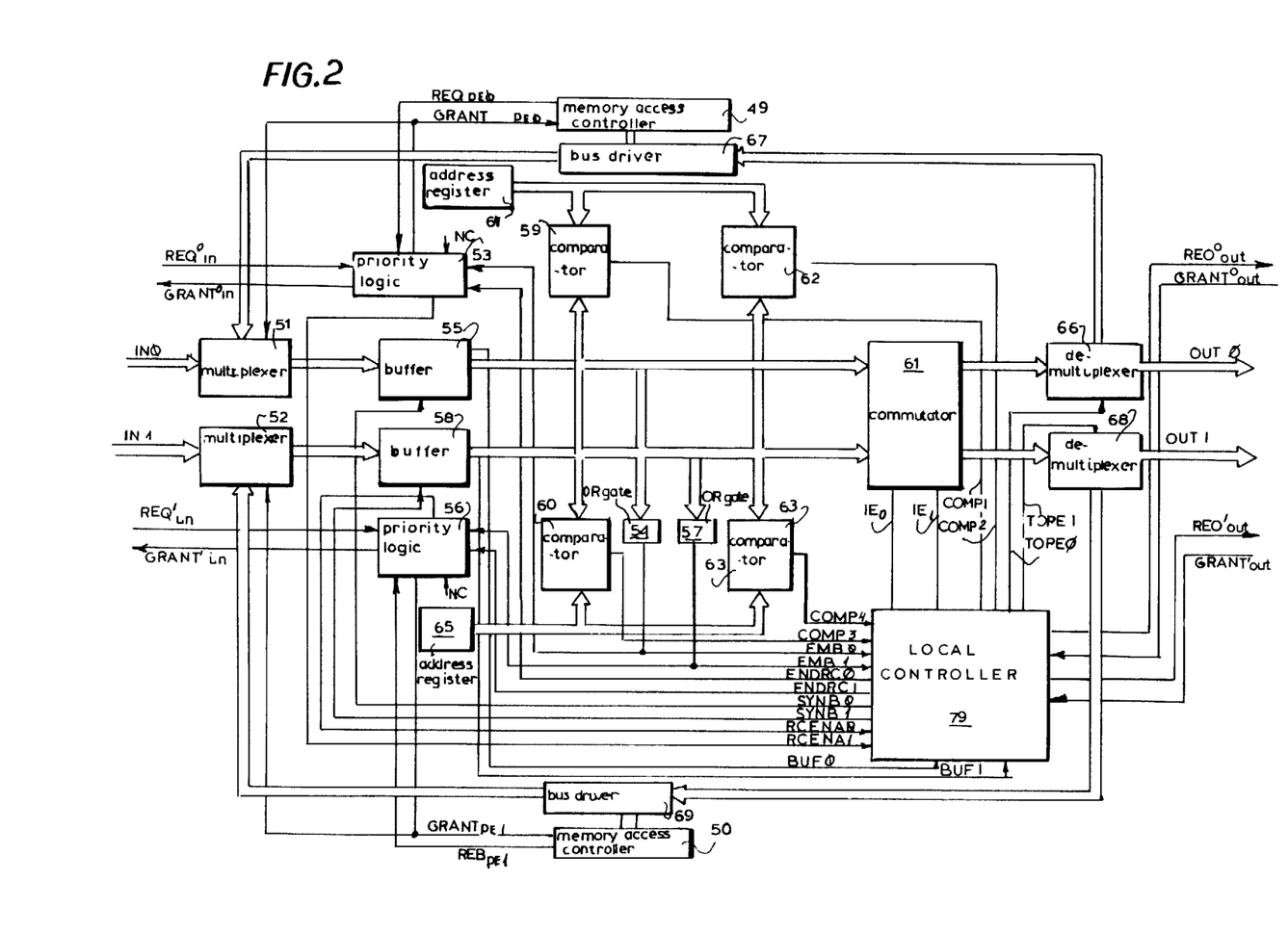
FIG. 2 is a block diagram of the communication node.

Each communication node comprises two identical multiplexers 51 and 52, the first data inputs of which are connected respectively to the information buses in both inputs of the communication node IN1 and IN0, the second data inputs of which are connected via buffers to the data buses of the respective direct memory access controllers 49 and 50 of the adjacent microcomputer modules.

Figure 3:
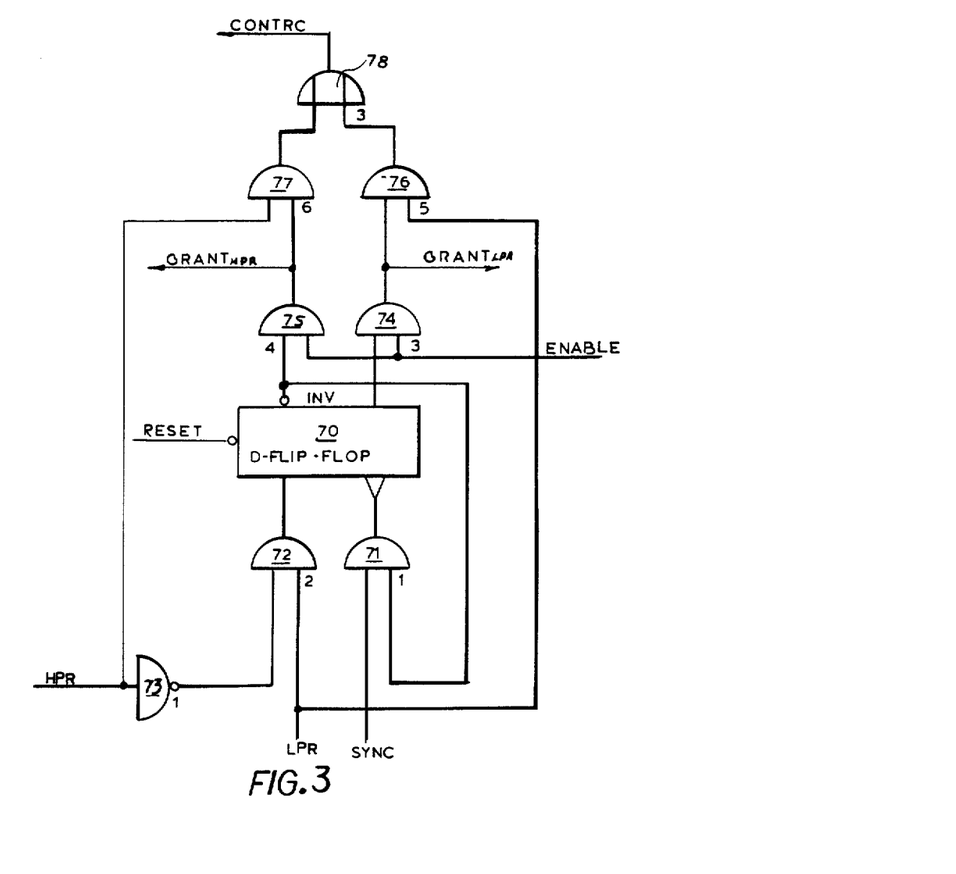
FIG. 3 is a block diagram of the priority logic within the communication node.

The communication node comprises a priority logic 53 (FIGS. 2 and 3). The high-priority input HPR of the priority logic 53 (FIG. 3) is connected to the control line for request from the preceding stage of the first input of the communication node $REQ_{IN}{}^0$. The low-priority input LPR is connected to the request output of the first direct memory access controller REQPEO. The resetting input RESET is connected to the output for end of receiving in the first input buffer of the local controller ENDRCO. The synchronizing input SYNC is connected to the clock generator of the network NC. The enabling input ENABLE is connected via an OR gate 54 to the data output of the first input buffer 55. The granting output for high priority $GRANT_{HPR}$ is connected to the control line for granting of the preceding stage of the first input of the communication node $GRANT_{IN}{}^0$. The low-priority granting output $GRANT_{LPR}$ is connected to the granting input of the first direct memory access controller $GRANT_{PEO}$. The control output CONTRC is connected to the input of the local controller for start-of-receiving in the first input buffer RCENA1.

The communication node comprises a second priority logic 56 which is identical to the first 53. Its high-priority input HPR is connected to the control request line of the preceding stage of the second input of the communication node $REC_{IN}{}^1$. The low-priority input LPR of logic 56 is connected to the request output of the second direct memory access controller $REQ_{PE1}$. The resetting input RESET of logic 56 is connected to the output for end-of-receiving in the second input buffer of the local controller ENDRC1, and its synchronizing input SYNC is connected to the clock generator of the network NC. The enabling input ENABLE of logic 56 is connected via an OR gate 57 to the data output of the second input buffer 58, and its high-priority granting output $GRANT_{HPR}$ is connected to the grant control line of the preceding stage of the second input of the communication node $GRANT_{IN}{}^1$. The low-priority granting output $GRANT_{LPR}$ of logic 56 is connected to the grant input of the second direct memory access controller $GRANT_{PE1}$, and its control output CONTRC is connected to the input of the local controller for the start-of receiving in the second input buffer RCENA1.

The communication node comprises an input buffer 55, which is a stack of "master-slave" D-flip-flops, the synchronizing inputs of which are connected in parallel and represent the synchronizing input of the input buffer, which is connected to the synchronizing output of the first input buffer of the local controller SYNB0.

The data input of the input buffer 55 is connected to the output of the first multiplexer 51, its data output is connected to the inputs of the digital comparators 59 and 60, to the first data input of commutator 61 or, via an OR gate 54, to the input of the local controller for an empty first buffer EMB0, the most significant digit of its output register being connected to the input of the local request controller of the first input buffer BUF0.

The communication node (FIG. 2) comprises a second input buffer 58 which is identical to the first input buffer 55, but differing in that its synchronizing input is connected to the output of the local synchronization controller of the second input buffer SYNB1, its data input is connected to the output of the second multiplexer 52, while its data output is connected to the inputs of the digital comparators 62, 63 of the second data input of commutator 61 or, via an OR gate 57, to the input of the local controller for empty second buffer EMB1, and the most significant digit of its output register is connected to the input of the local controller for request of the second input buffer BUF1.

The communication node comprises an address register 64, the output of which is connected to the second inputs of the digital comparators 59 and 60 and a second address register 65, the output of which is connected to the second inputs of the digital comparators 60 and 63.

The outputs of the four digital comparators are connected respectively to the four inputs of the local controller for coincidence of the destination address COMP1, COMP2, COMP3 and COMP4.

Both control inputs of the commutator 61 are connected respectively to both control outputs of the local controller for dynamic reconfiguration $IE_0$ and $IE_1$.

The first data output of the commutator 61 is connected to the information input of demultiplexer 66, the address input of which is connected to the output of the local grant controller for transmission to the first adjacent microcomputer module TOPE0.

The first data output of demultiplexer 66 is connected to the data bus of the first input of the communication node OUT0, while its second data output is connected via a bus driver 67 to the data bus of the first controller for direct memory access. The second data output of the commutator is connected to the data input of a second demultiplexer 68, the address input of which is connected to the output of the local grant controller for grant of transmission to the second adjacent microcomputer module TOPE1.

The first data output of the second demultiplexer 68 is connected to the data bus of the second output of communication node OUT1, while its second data output is connected via a bus driver 69 to the data bus of the second controller for direct memory access.

The priority logic 53 and 56 (FIG. 3) comprises a D-flip-flop 70, the resetting input of which is its resetting input RESET, the synchronizing input of the D-flip-flop is connected via the AND gate 71 to the synchronizing input of the priority logic SYNC and the inverse output of the flip-flop, while its data input is connected via an AND gate 72 to the low-priority input of the priority logic LPR and the second input of the AND gate 79 is connected via an inverter 73 to the high-priority input of the priority logic HPR.

The direct and the inverse outputs of the D-flip-flop 70 are connected respectively via AND gates 74 and 75, the second inputs of which are connected to the enabling input of the priority logic ENABLE, to the grant outputs of the priority logic for low and high priority $GRANT_{LPR}$ and $GRANT_{HPR}$ and also to the inputs of AND gates 76 and 77, the second inputs of which are connected respectively to the low-priority and the high-priority inputs of the priority logic LPR and HPR. The outputs of the AND gates 76 and 77 are connected via an OR gate 78 to the control output of the priority logic CONTRC.

The communication node (FIG. 2) comprises a local controller 79 (FIG. 4), the input of which for empty first buffer EMB0 is connected via a differentiating circuit 80 and an inverter 81 to a monostable multivibrator 82, the output of which is connected to the resetting inputs of the first D-flip-flops 83, 84, 85 of the logical controller 79 and also to the first inputs of the AND gates 86 and 87.

Figure 4:
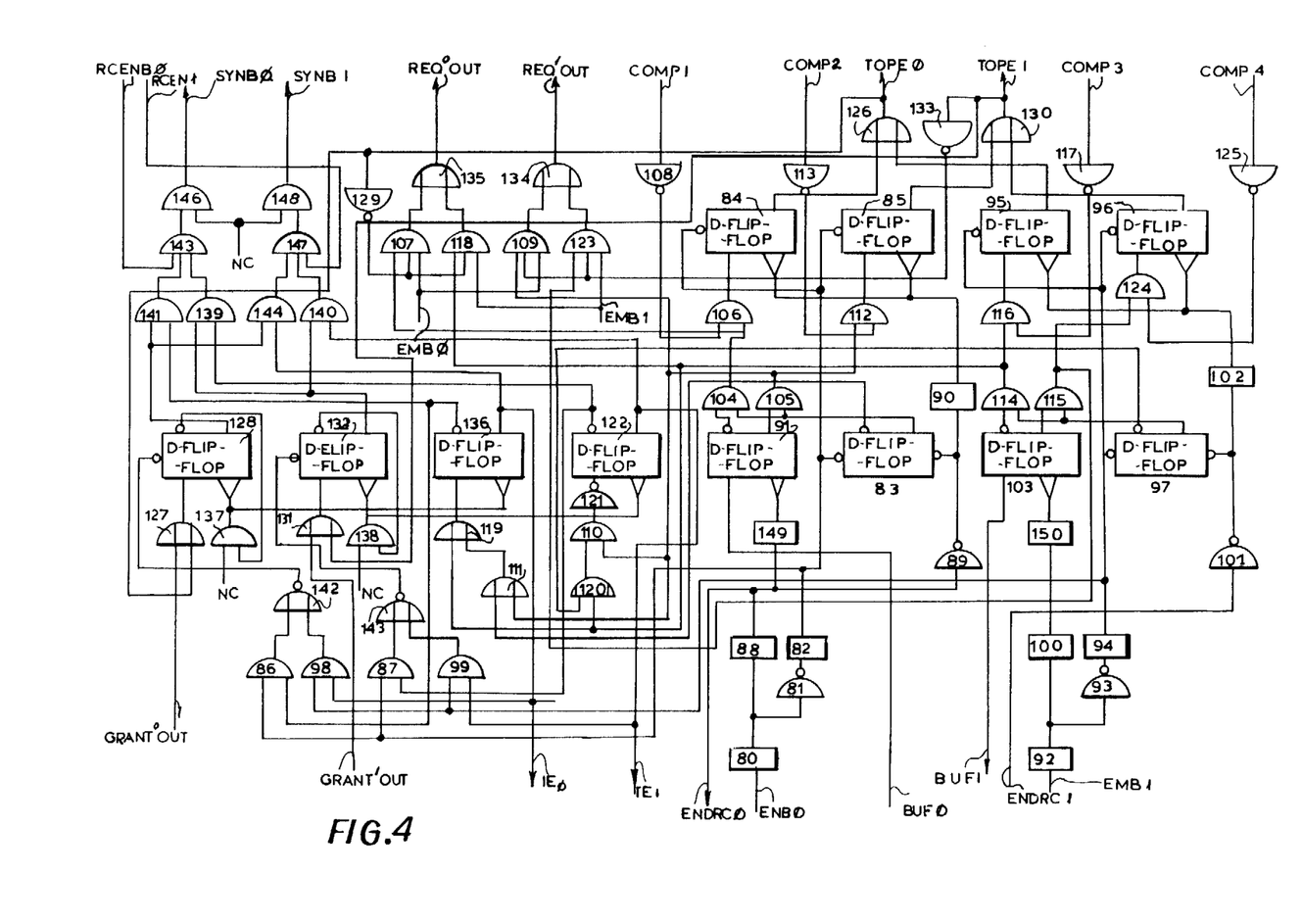
FIG. 4 is a block and circuit diagram of the local controller within the communication node.

The output of the first differentiating circuit 80 is also connected to a monostable multivibrator 88, the output of which is connected to the output of the local controller for end-of-receiving in the first input buffer ENDRC0 and also via 91 inverter 89 to the setting input of D-flip-flop 83.

The output of inverter 89 is connected via delay elements 90 to the synchronizing inputs of D-flip-flops 84 and 85.

The input of the local controller for empty second buffer EMB1 is connected via the differentiating circuit 92 and the inverter 93 to the input of the monostable multivibrator 94, the output of which is connected to the resetting inputs of D-flip-flops 95, 96 and 97 in the local controller 79 and also to the first inputs of the AND gates 98 and 99.

The output of the differentiating circuit 92 is also connected to the monostable multivibrator 100, the output of which is connected to the output of the local controller 79 for end-of-receiving in the second input buffer ENDRC1 and also via the inverter 101 to the setting input of D-flip-flop 97.

The output of inverter 101 is also connected via a second delay element 102 to the synchronizing inputs of the D-flip-flops 95 and 96.

The data input of D-flip-flop 91 is connected to the input of the local controller for request of the first input buffer BUF0, while the data input of D-flip-flop 103 is connected to the input of the local controller for request of the second input buffer BUF1.

The first output of the D-flip-flop 83 is connected in parallel with the first inputs of the AND gates 104 and 105, to the second inputs of which there are connected respectively the inverse and the direct outputs of D-flip-flop 91. The output of AND gate 104 is connected to the first inputs of the AND gates 106 and 107, while the second input of AND gate 106 is connected via inverter 108 to the first input of the local controller for coincidence with the destination address COMP1 and its output is connected to the data input of D-flip-flop 84.

The output of AND gate 105 is connected to the first inputs of AND gates 109 and 110, to the first input of OR gate 111 and also to the first input of AND gate 112, the second input of which is connected via inverter 113 to the second input of the local controller for coincidence with the destination address COMP2, the output of which is connected to the data input of D-flip-flop 85.

The direct output of D-flip-flop 97 is connected to the first inputs of AND gates 114 and 115, the second inputs of which are connected respectively to the inverse and the direct outputs of D-flip-flop 103, while the output of AND gate 114 is connected via AND gate 116 to the data input of D-flip-flop 95, while the second input of AND gate 116 is connected via inverter 118 to the third input of the local controller for coincidence with the destination address COMP3.

The output of and gate 114 is also connected to the first inputs of the two AND gates 118 and 119 and to the first input of OR gate 120, the second input of which is connected to the inverse output of D-flip-flop 98 and the output of which is connected via a second input to the AND gate 110 and the inverter 121 to the data input of D-flip-flop 122. The output of AND gate 115 is connected to the first inputs of two AND gates 123 and 124, while the second input of the latter is connected via inverter 125 to the fourth input of the local controller for coincidence of the address of destination COMP4 and its output is connected to the data input of D-flip-flop 96.

The direct outputs of both D-flip-flops 84 and 95 are combined in an OR gate 126, the output of which is connected to the output of the local controller for granting transmission to the first adjacent microcomputer module TOPE0 and also to the second input of OR gate gate 127, the first input of which is connected to the input of the local controller for granting transmission from the first output of the communication node to the next-following stage $GRANT_{OUT}^0$, while the output of OR gate 127 is connected to the data input of D-flip-flop 128.

The output of OR gate 126 is connected also via inverter 129 to the second inputs of two AND gates 107 and 118.

The direct outputs of both D-flip-flops 85 and 96 are combined in an OR gate 130, the output of which is connected to the output of the logical controller for granting transmission to the second adjacent microcomputer module TOPE1 and also to the second input of OR gate 131, the first input of which is connected to the input of the local controller for granting transmission from the second output of the communication node to the next-following stage $GRANT_{OUT}^1$ and the output of which is connected to the data input of D-flip-flop 132.

The output of OR gate 130 is also connected via inverter 133 to the second inputs of the two AND gates 109 and 123, the outputs of which are combined in OR gate 134, the output of which is connected to the second output of the local controller for request to the next-following stage $REQ_{OUT}^1$.

The third inputs of both AND gates 107 and 109 are connected to the input of the local controller for empty first buffer EMB0, while the third inputs of both AND gates 118 and 123 are connected to the input of the local controller for empty second buffer EMB1.

The outputs of both AND gates 107 and 118 are combined in an OR gate 135, the output of which is connected to the first output of the local controller for request to the next-following stage $REQ_{OUT}^0$.

The synchronizing inputs of both D-flip-flops 128 and 136 are connected via an AND gate 137 to the clock generator of the network NC and the inverse output of D-flip-flop 128.

The synchronizing inputs of both D-flip-flops 122 and 132 are connected via AND gate 138 to the clock generator of the network NC and the inverse output of D-flip-flop 132.

The direct output of D-flip-flop 132 is connected to the inputs of two AND gates 139 and 140.

The inverse output of D-flip-flop 136 is connected to the input of AND gate 141 and to the second input of AND gate 86, the output of which is combined with output of another AND gate 98 into a NOR gate 142, the output of which is connected to the resetting input of D-flip-flop 128.

The inverse output of D-flip-flop 122 is connected to the second input of AND gate 139 and also the second input of another AND gate 87, the output of which is combined with the output of AND gate 99 into a NOR gate 143, the output of which is connected to the resetting input of D-flip-flop 132.

The direct output of D-flip-flop 136 is connected to the second inputs of the two AND gates 144 and 98 and is also connected to the first output of the local controller for dynamic reconfiguration IEo.

The direct output of the D-flip-flop 122 is connected to the second inputs of two AND gates 140 and 99 and also to the second output of the local controller for dynamic reconfiguration IE1.

The first inputs of both AND gates 141 and 144 are connected to the direct output of D-flip-flop 128. The outputs of both AND gates 141 and 139 are combined together with the input of the local controller for start of receiving in a first input buffer RCENA0 into an OR gate 145, the output of which is connected via an AND gate 146 to the output of the local controller for synchronization of the first input buffer SYNB0.

The outputs of AND gates 140 and 144 are combined together with the input of the local controller for start of receiving in a second input buffer RCENA1 into an OR gate 147, which is connected via an AND gate 148 to the output of the local controller for synchronization of the second input buffer SYNB1.

The second inputs of the AND gates 146 and 148 are connected to the clock generator of the network NC. The inverse output of the D-flip-flop are connected to the input of OR gate 161, the output of which is connected via AND gate 119 to the data input of D-flip-flop 136.

The outputs of the monostable multivibrators 88 and 100 are connected respectively via delay elements to the synchronizing inputs of the fourth and the eighth D-flip-flops 91 and 103.

The operation of the multiprocessor system operates as follows:

For realizing an interprocessor data exchange with the object of synchronization and distributed balancing of the load in the supersystem, the processors in the microcomputer modules generate a packet, the first byte of which contains the destination address of the packet. The first adjacent microcomputer module passes a request to the communication node via the request line $REQ_{PE0}$ of the respective controller for direct memory access 49 to the low-priority input LPR of the priority logic 53 of the communication node.

In the case of no request from the preceding stage $REQ_{IN}^0$ and empty input buffer EMB0, the priority logic 53 grants the receiving of the packet by the first adjacent microcomputer module $GRANT_{PE0}$ via the second data input of multiplexer 51 in the first input buffer 55.

In the case of a request passed from the preceding stage to the first input of communication node $REQ_{IN}^0$ via the high-priority input HPR of priority logic 53 and an empty first input buffer EMB0, there is granted the receiving of the packet from the preceding stage GRANT$_{IN}$⁰ via the data bus of the first input of communication node IN0 and the first data input of multiplexer 51.

The receiving is started by a signal of the control output CONTRC of priority logic 53, which is passed to the input of the local controller 79 for start-of-receiving in the first input buffer RCENA0, enabling the synchronizing input of the stack of the first input buffer SYNB0 via OR gate 145 and AND gate 146 of the local controller 79.

The receiving of the first byte of the packet in the ouput register of the first input buffer 55 is fixed by the differentiating circuit in local controller 80, the output signal of which activates the monostable multivibrator 88.

The output signal of the monostable multivibrator 88 is the output signal of the local controller for end of receiving in the first input buffer ENDRC0, which resets the D-flip-flop in the priority logic 70, enables via delay element 146 the synchronizing input of the request flip-flop of the first input buffer 91 of the local controller, which is loaded with the most significant digit value of the output register of the first input buffer BUF0. The signal for end-of-receiving in the first input buffer ENDRC0 sets via inverter 89 the flip-flop for request validity of the first input buffer 83, and via delay element 90 is passed to the synchronizing inputs of two of the coincidence flip-flops 84 and 85.

The second adjacent microcomputer module passes a request to the communication node via the request line REQ$_{PE1}$ of the respective controller for direct memory access 50 to the low-priority input LPR of priority logic 56 of the communication node.

In the case of no request from the preceding stage REQ$_{IN}$¹ and empty second input buffer EMB1, the priority logic 56 grants the receiving of the packet by the second adjacent microcomputer module GRANT-$_{PE1}$ via the second information input of multiplexer 52 in the second input buffer 58.

In the case of a request passed from the preceding stage to the second input of communication node REQ$_{IN}$¹ via the high-priority input HPR of priority logic 56 and of an empty second input buffer EMB1, there is granted the receiving of the packet from the preceding stage GRANT$_{IN}$¹ via the data bus of the second input of communication node IN1 and the first data input of multiplexer 52.

The receiving is started by a signal of the control input CONTRC of priority logic 56, which is passed to the input of the local controller 79 for the start-of-receiving in the second input buffer RCENA1, enabling the synchronizing input of the stack of the second input buffer SYNB1 via OR gate 147 and AND gate 148 of the local controller 79.

The receiving of the first byte of the packet in the output register of the second input buffer 58 is fixed by a differentiating circuit in local controller 92, the output signal of which activates the monostable multivibrator 100.

The output signal of the monostable multivibrator 100 is the output signal of the local controller 79 for end-or-receiving in the second input buffer ENDRC1, which resets the D-flip-flop in the priority logic 56, enables the synchronizing input via the delay element 150 of the request flip-flop of the second input buffer 103 of the local controller 79, which is loaded with the most significant digit value of the output register of the second input buffer BUF1.

The signal for end-of-receiving in the second input buffer ENDRC1 sets via inverter 101 the flip-flop for request validity of the second input buffer 97, and via a delay element 102 is passed to the synchronizing inputs of two of the coincidence triggers 95 and 96.

In the case of coincidence of the packet address in the first buffer 55 with the address of the first adjacent microcomputer module 64, the output signal COMP1 of digital comparator 59 sets via inverter 108 and OR gate 106 the respective coincidence flip-flop 84. In the case of coincidence of the packet address in the second input buffer 58 with the address of the first adjacent microcomputer module 64, the output signal COMP3 of digital comparator 62 sets via inverter 117 and OR gate 116 the respective coincidence flip-flop 95. One of the signals of the direct outputs of the coincidence flip-flops 84 and 95 sets, via OR gates 126 and 127 at free first output port, the occupied flip-flop of the first output port 128.

In the case of coincidence of the packet address in the first input buffer 55 with the address of the second adjacent microcomputer module 65, the output signal COMP2 of digital comparator 60 sets via inverter 113 and OR gate 112 the respective coincidence flip-flop 85. In the case of coincidence of the packet address in the second input buffer 58 with the address of the second adjacent microcomputer module 65, the output signal COMP4 of digital comparator 63 sets via inverter 125 and OR gate 124 the respective coincidence flip-flop 96. One of the signals of the direct outputs of the coincidence flip-flops 85 and 96 sets via OR gates 130 and 131 at free second output port the occupied flip-flop of the second output port 132.

In the case of non-coincidence of the destination address of the packet in the first input buffer with addresses of both adjacent microcomputer modules at reset request flip-flop of the first input buffer 91 and set flip-flop for request validity 83, the signals of their respective outputs via AND gates 104 and 107 and OR gate 135 form the request signal for the next-following stage of the first output of communication node REQ$_{OUT}$⁰ until, at set request flip-flop of the first input buffer 91 and set request validity flip-flop 83, the signals of their respective outputs via AND gates 105 and 109 and OR gate 134 form the request for the next-following stage of the second output of communication node REQ$_{OUT}$¹.

In the case of non-coincidence of the packet address in the second input buffer with the addresses of both adjacent microcomputer modules at reset request flip-flop of the second input buffer 103 and set request validity flip-flop 97, the signals of their respective outputs via AND gates 114 and 118 and OR gate 135 form a request for the next-following stage of the first output of communication node REQ$_{OUT}$⁰, while at set request flip-flop 103 and set request validity flip-flop 97 the signals of their respective outputs via AND gates 115 and 123 and OR gate 134 form a request for the next-following stage of the second output of communication node REQ$_{OUT}$¹.

In the case of a request passed from the first output of the communication node REQ$_{OUT}$⁰, the signal in the line for grant by the respective communication node of the preceding stage GRANT$_{OUT}$⁰ sets, in the case of a free first output port, via the OR gate 127 the occupied flip-flop of the first output port 128.

In the case of a request passed from the second output of the communication node REQ$_{OUT}{}^1$, the signal in the line for grant by the respective communication node of the preceding stage GRANT$_{OUT}{}^1$ sets, in the case of free second output port, via the OR gate 131 the occupied flip-flop of the second output port 132.

The synchronizing inputs of the occupied flip-flop and the flip-flop for control of the dynamic reconfiguration 136 are granted simultaneously as valid request from the first input buffer 55 to the first output port via OR gate 111, and AND gate 119 resets the flip-flop for control of the dynamic reconfiguration 136, the inverse output of which $\overline{IE}_o$ grants the transmission from the first input buffer 55 via the first output port of the commutator 61.

In the case of invalid request from the first input buffer and of valid request from the first input buffer for the second output port 111, the valid request from the second input buffer 115 sets via AND gate 119 the flip-flop for control of the dynamic reconfiguration 136, and the high potential of its direct output $IE_o$ grants the transmission from the second input buffer 58 via the first output port of commutator 61.

The synchronizing inputs of the flip-flop for occupation of the second output port 132 and the flip-flop for control of the dynamic reconfiguration of the second output port 122 are granted simultaneously as valid request from the first input buffer 55 to the second output port if there is no identical request or in case of invalidity of the request of the second input buffer via AND gate 110 and inverter 121, it resets the flip-flop for control of the dynamic reconfiguration of the second output port 122, and the low potential of its direct output $\overline{IE}_1$ grants the transmission from the first input buffer 55 via the second output port of commutator 61.

The valid request of the second input buffer for the second output port sets the flip-flop for control of the dynamic reconfiguration 122 via AND gate 114, OR gate 120, AND gate 110 and inverter 121, and the high potential of its direct output $\overline{IE}_1$ grants the transmission from the second input buffer 58 via the second output port of commutator 61.

The start of transmission from the first input buffer 55 is realized by the high potential of the inverse output of one of the flip-flops for control of the dynamic reconfiguration 132, 122, which respectively via AND gates 141, 139, OR gate 145 and AND gate 146 enables the synchronizing inputs of the flip-flops in the stack of the first input buffer SYNB0. The start of transmission from the second input buffer 58 is realized by the high potential of the direct output of one of the flip-flops for control of the dynamic reconfiguration 132, 122, which respetively via AND gates 144, 140, OR gate 147 and AND gate 148 enables the synchronizing inputs of the flip-flops in the stack of the second input buffer SYNB1.

When during transmission via the first output port there is a coincidence of the packet address with the address of the first adjacent microcomputer module, the respective signal of the local coincidence controller TOPE0 grants via the address input of demultiplexer 66 the transmission of the packet via demultiplexer 66 and bus driver 67 to the direct-memory-access controller 49. When a request is confirmed by the next-following stage GRANT$_{OUT}{}^1$ the packet is transmitted via demultiplexer 66 and the data bus of the first output of the communication node OUT0 to the next-following stage.

When during transmission via the second output port there is a coincidence of the packet address with the address of the second adjacent microcomputer module, the respective signal of the local coincidence controller TOPE1 grants via the address input of demultiplexer 68 the transmission of the packet via demultiplexer 68 and bus driver 69 to the direct-memory-access controller 50. When a request is confirmed by the next-following stage GRANT$_{OUT}{}^1$ the packet is transmitted via demultiplexer 68 and the data bus of the second output OUT1 to the next-following stage.

At the end of transmission from the first input buffer 55, depending on the dynamic reconfiguration of the commutator $IE_o$, $IE_1$, the output signal of the monostable multivibrator 82 sets the respective occupation flip-flop 128 or 132, and the signal from its direct output blocks by means of the output signal of the synchronization controller SYNB0 the synchronizing inputs in the flip-flops of the first input buffer 55, resets the flip-flop for request validity 83 and the respective flip-flops for coincidence 84, 85 until the signal for empty input buffer EMB0 via AND gate 107, 109 resets the request to the next-following stage REQ$_{OUT}{}^0$, REQ$_{OUT}{}^1$ if there has been such a request.

At the end of transmission from the second input buffer 58, the output signal of the monostable multivibrator 94 resets the respective flip-flop for occupation 128 or 132, resets the flip-flop for request validity 97 the respective coincidence flip-flops 94, 95, and blocks by means of the output signal of the local synchronization controller SYNB1 the synchronizing input of the second input buffer 58, while the signal for empty buffer EMB1 resets via AND gate 118, 123 the request to the preceding stage, if there has been such a request.

We claim:

1. A multiprocessor system comprising a matrix of 32 standard microcomputer modules, connected for microprocessor exchange by an interconnection network of communication nodes with cyclic structure, distributed uniformly in four stages, and wherein each connection between the communication nodes is a bus which comprises data and control lines, wherein:

a first output of a first communication node of a first of said stages of the interconnection network (33) is connected to a first input of a first communication node of a second of said stages (37);

a second input of the first communication node of the first stage (33) is connected to a first input of a third communication node of the second stage (39);

a first output of a second communication node of the first stage (34) is connected to a second input of a first communication node of the second stage (37);

a second output of the second communication node of the first stage (34) is connected to a second input of a third communication node of the second stage (39); a first output of a third communication node of the first stage (35) is connected to a first input of the second communication node of the second stage (38);

a second output of the third communication node of the first stage (35) is connected to a first input of a fourth communication node (36) of the second stage (40), a first output of the fourth communication node (36) of the first stage is connected to a second input of a second communication node of the second stage (38);

a second output of the fourth communication node of the first stage (36) is connected to a second input of the fourth communication node of the second stage (40);

the communication connection between the second and a third of said stages are identical to the communication connections between the first and the second stages;

the outputs of the communication nodes of the third stage are distributed uniformly in two groups and the outputs of the communication nodes of a first of said groups (41 and 42) are connected respectively to the first inputs of the communication nodes of a fourth of said stages (45, 46, 47, 48);

the outputs of the communication nodes of a second of said groups (43 and 44) are connected respectively to the second inputs of the communication nodes of the fourth stage; and the communication connections between the fourth and the first stages are identical to the communication connections between the third and the fourth stages.

2. The multiprocessor system according to claim 1, wherein each communication node comprises two inputs, each of which comprises a data bus (IN0 and IN1) and respective control lines for request and grant from a preceding stage ($REQ_{IN}$ and $GRANT_{IN}$), and two outputs, each of which comprises a data bus (OUT0 and OUT1) and respective control lines for request and grant to a next-following stage ($REQ_{OUT}$ and $GRANT_{OUT}$), and to each communication node of the network there are connected two microcomputer modules by means of direct-memory-access controllers (49 and 50), synchronizing inputs of said direct-memory-access controllers being connected to a clock generator of the interconnection network, each of said communication nodes containing two identical multiplexers (51 and 52) having:

first data inputs connected respectively to the data buses of both inputs of a respective communication node (IN0 and IN1);

second data inputs connected via buffers to the data buses of a respective direct-memory-access controllers (49 and 50) of adjacent microcomputer modules;

a priority logic (53) having:
a high-priority input (HPR) which is connected to the control line for request from the preceding stage of the first input of communication node ($REQ_{IN}{}^0$), a low-priority input (LPR) connected to the output for request of the first direct-memory-access controller ($REQ_{PE0}$), a resetting input (RESET) connected to an output for end of receiving in a first input buffer of a local controller (ENDRC0), a synchronizing input (SYNC) connected to the network clock generataor (NC), an enabling input (ENABLE) connected via an OR gate (54) to a data output of the first input buffer (55), a high-priority grant output ($GRANT_{HPR}$) connected to a control line for grant from a preceding stage of the first input of the communication node ($GRANT_{IN}$), a low-priority grant output ($GRANT_{LPR}$) connected to a grant input of the first direct-memory-access controller ($GRANT_{PE0}$), a control output (CONTRC) connected to the input of the local controller for start of receiving in the first input buffer (RCENA0);

a second priority logic (56) which is identical to the first priority logic (53) and having:

a high-priority input (HPR) connected to a control line for request from the preceding stage of a second input of the communication node (REQIN), a low-priority input (LPR) connected to the request output of the second direct-memory-access controller ($REQ_{PE1}$), a resetting input (RESET) connected to the output for end of receiving in the second input buffer of the local controller (ENDRC1), a synchronizing input (SYNC) connected to the network clock generator (NC), an enabling input (ENABLE) connected via an OR gate (57) to a data output of a second input buffer (58), a grant output for high-priority ($GRANT_{HPR}$) connected to the control line for grant from the preceding stage of the second input of the communication node ($GRANT_{IN}{}^1$), a low-priority output ($GRANT_{LPR}$) connected to a grant input of a second direct-memory-access controller ($GRANT_{PE1}$), a control output (CONTRC) connected to the input of the local controller for start of receiving in the second input buffer 9RCENA1);

each first input buffer (55) is a stack built-up of "master-slave" D-flip-flops having:

synchronizing inputs connected in parallel and representing the synchronizing input of the input buffer, which is connected to the synchronization output of the first input buffer of the local controller (SYNB0), a data input of the input buffer (55) connected to the output of a first of said multiplexers (51), and a data output connected to inputs of a first and a second digital comparator (59 and 60), to the first data input of commutator (61) and via an OR gate (54) to the input of the local controller for empty first buffer (EMB0), while the most-significant-digit of its output register is connected to the input of the local request controller of the first input buffer (BUFO);

each second input buffer (58) is identical to the first input buffer (55) having:

a synchronizing input connected to the output of the local synchronization controller of the second input buffer (SYNB1), a data input connected to the output of the second multiplexer (52), a data output connected to the inputs of a third and a fourth digital comparator (62, 63), to the second data input of commutator (61) and via a second OR gate (57) to the input of the local controller for empty second buffer (EMB1), while the most-significant-digit of its output register is connected to the input of the local request controller of the second input buffer (BUF1);

each communication node comprising a first address register (64), an output of which is connected to second inputs of the first and the third digital comparators (59 and 62) and a second address register (65), an output of which is connected to second inputs of the second and the fourth digital comparators (60 and 63);

outputs of said digital comparators are connected respectively to four inputs of a local controller for coincidence of the address of destination (COMP1, COMP2, COMP3, COMP4), while control inputs of a commutator (61) are connected respectively to both control outputs of a local controller for dynamic reconfiguration (IE$_0$, IE$_1$), and at that a first data output of commutator (61) is connected to the data input of a demultiplexer (66);

said demultiplexer having:
an address input connected to the output of a local controller for grant of transmission to a first adjacent microcomputer module (TOPEO),
a first data output connected to the data bus of the first output of the communication node (OUTO), and
a second data output connected via bus driver (67) to the data bus of the first direct-memory-access controller;

a second data output of commutator (61) is connected to an information input of a second demultiplexer (68), said second demultiplexer having an address input connected to an output of the local controller for grant of transmission to a second adjacent microcomputer module (TOPE1); and a first data output of the second demultiplexer (68) is connected to the data bus of the second output of communication node (OUT1), while its second data output is connected via a bus driver (69) to the data bus of the second direct-memory-access controller (50).

3. The multiprocessor system defined in claim 2, wherein each said priority logic (53 and 56) comprises a D-flip-flop (70), the resetting input of which represents its resetting input (RESET), the synchronizing input of the D-flip-flop is connected via an AND gate (71) to the synchronizing input of priority logic (SYNC) and an inverse output of the flip-flop, while its data input is connected via a second AND gate (72) to the low-priority input of the priority logic (LPR), and the second input of the second AND gate (72) is connected via an inverter (73) to the high-priority input of the priority logic (HPR), direct and the inverse outputs of the D-flip-flop are connected respectively by means of a third and fourth AND gate (74 and 75) having second inputs connected to the enabling input of the priority logic (ENABLE), to the grant outputs of the priority logic for low and high priority (GRANT$_{LPR}$ and GRANT$_{HPR}$) and also to inputs of a fifth and a sixth AND gates (76 and 77) having second inputs connectd respectively to the low-priority and the high-priority inputs of the priority logic (LPR and HPR), the outputs of the fifth and sixth AND gates (76 and 77) are connected via a third OR GATE (78) to the control output of the priority logic (CONTRC).

4. The multiprocessor system defined in claim 3 wherein said local controller, has:
an input for empty first buffer (EMBO), which is connected via a differentiating circuit (80) and an inverter (81) to a monostable multivibrator (82),
an output of which is connected to resetting inputs of three D-flip-flops (83, 84, 86) of the local controller (79) and also to first inputs of a seventh and an eighth AND gates (86 and 87), and the output of the first differentiating circuit (80) is also connected to a second monostable multivibrator (88), the output of which is connected to an output of the local controller for end of receiving in the first input buffer (ENDRCO) and also via a second inverter (89) to a setting input of a first of said three D-flip-flops (83), and an output of the second inverter (89) is connected via a delay element (90) to the synchronizing inputs of a second and a third of said D-flip-flop (84 and 85),
an input of the local controller for empty second buffer (EMB1) is connected via a second differentiating circuit (92) and a third inverter (93) to the input of a third monostable multivibrator (94),
an output of which is connected to resetting inputs of a fifth, a sixth and a seventh D-flip-flops (95, 96, 97) in the local controller (79) and also the first inputs of a ninth and a tenth AND gates (98 and 99), and an output of a second differentiating circuit (92) is also connected to a fourth monostable multivibrator (100), an output of which is connected to the output of the local controller (79) for end of receiving in the second input buffer (ENDRC1) and also via a fourth inverter (101) to a setting input of the seventh D-flip-flop (97), an output of the fourth inverter (101) is also connected via a second delay element (102) to synchronizing inputs of a fifth and a sixth D-flip-flops (95 and 96), while a data input of the fourth D-flip-flop (91) is connected to an input of the local request controller of the first input buffer (BUFO), while a data input of the eighth D-flip-flop (103) is connected to an input of the local request controller of the second input buffer (BUF1), a direct output of the first D-flip-flop (83) is connected in parallel to first inputs of an eleventh and a twelfth AND gates (104 and 105), to the second inputs of which there are connected respectively inverse and the direct outputs of the fourth D-flip-flop (91), an output of the eleventh AND gate (104) is connected to first inputs of thirteenth and fourteenth AND gates (106 and 107), and a second input of the thirteenth AND gate (106) is connected via a fifth inverter (108) to a first input of the local controller for coincidence with the address of destination (COMP1) and its output is connected to the data input of the second D-flip-flop (84), while an output of the twelfth AND gate (105) is connected to first inputs of fifteenth and sixteenth AND gates (109 and 110), to a first input of a fourth OR gate (111) and also to a first input of a seventeenth AND gate (112), a second input of which is connected via a sixth inverter (113) to a second input of the local controller for coincidence of the address of destination (COMP2) and its output is connected to the data input of the third D-flip-flop (85), a direct output of the seventh D-flip-flop (97) is connected to first inputs of the eighteenth and the nineteenth AND gates (114 and 115), second inputs of which are connected respectively to inverse and the direct outputs of the eighth D-flip-flops (103), an output of the eighteenth AND gate (114) is connected via a twelfth AND gate (116) to a data input of the fifth D-flip-flop (95), while a second input of the twentieth AND gate (116) is connected via a seventh inverter (118) to a third input of the local controller for coincidence with the address of destination (COMP3), an output of the eighteenth AND gate (114) is connected to first inputs of twentyfirst and the twentysecond AND gates (118 and 119) and to a first input of the fifth OR gate (120), a second input of which is connected to the inverse output of the seventh D-flip-flop (98) and the output of which is connected via a second input of the sixteenth AND gate (110) and the eighth inverter (121) to the data input of the ninth D-flip-flop (122), the output of the nineteenth AND gate (115) is connected to first inputs of twentythird and the twentyfourth AND gates (123 and 124), and a second input of the latter is connected via a ninth inverter (125) to a fourth input of the local controller for coincidence of the address of destination (COMP4) and its output is connected to a data input of the sixth D-flip-flop (96), while the direct outputs of the second and the fifth D-flip-flops (84 and 95) are combined into a sixth OR gate (126), an output of which is connected to an output of the local controller for grant of transmission to the first adjacent microcomputer module (TOPEO) and also to a second input of the seventh OR gate (127), the first input of which is connected to the input of the local controller for grant of transmission from the first output communication node to the next-following stage (GRANT$_{OUT}$), an output of the seventh OR gate (127) is connected to a data input of the tenth D-flip-flop (128), an output of the sixth OR gate (126) is connected via a tenth inverter (129) to second inputs of the fourteenth and the twentyfirst AND gates (107 and 118), the direct outputs of the third and the sixth D-flip-flops (85 and 96) are combined into an eighth OR gate (130), an output of which is connected to the output of the local controller for grant of transmission to the second adjacent microcomputer module (TOPE1) and also to a second input of a ninth OR gate (131), a first input of which is connected to the input of the local controller for grant of transmission from the second output of the communication node to the next-following stage (GRANT$_{OUT}^1$) and an output of which is connected to a data input of an eleventh D-flip-flop (132), and an output of the eighth OR gate (130) is connected also via an eleventh inverter (133) to second inputs of the fifteenth and the twentythird AND gates (109 and 123), the outputs of which are combined into a tenth OR gate (134), the output of which is connected to the second output of the local controller for request to the next-following stage (REQ$_{OUT}^1$), and at that third inputs of the fourteenth and the fifteenth AND gates (107 and 109) are connected to the input of the local controller for empty first buffer (EMBO), while third inputs of the twentyfirst and the twentythird AND gates (118 and 123) are connected to the input of the local controller for empty second buffer (EMB1), the outputs of the fourteenth and the twentyfirst AND gates (1 and 18) are combined into an eleventh OR gate (135), an output of which is connected to the first output of the local controller for request to the next-following stage (REQ $_{OUT}^0$), synchronizing inputs of the tenth and the twelfth D-flip-flops (128 and 136) are connected via a twentyfourth AND gate (137) to the network clock generator (NC) and an inverse output of the tenth D-flip-flop (128), synchronizing inputs of the ninth and the eleventh D-flip-flops (122 and 132) are connected via a twentyfifth AND gate (138) to the network clock generator (NC) and an inverse output of the eleventh D-flip-flop (132), the direct output of which is connected to the inputs of a twentysixth and a twentyseventh AND gates (139 and 140), an inverse output of a twelfth D-flip-flop (136) is connected to an input of a twentyeighth AND gate (141) and to a second input of the seventh AND gate (86), an output of which is combined with an output of the ninth AND gate (98) into a NOR gate (142), an output of which is connected to a reset input of the tenth D-flip-flop (128), the inverse output of the ninth D-flip-flop (122) is connected to a second input of the twentysixth AND gate (139) and also to a second input of the eighth AND gate (87), an output of which is combined with the output of the tenth AND gate (99) into a second NOR gate (143), an output of which is connected to the reset input of the eleventh D-flip-flop (132), a direct output of the twelfth D-flip-flop (136) is connected to second inputs of the ninth and a twentyninth AND gates (198, 144) and is also connected to a first output of the local controller for dynamic reconfiguration (IEo), the direct output of the ninth D-flip-flop (122) is connected to second inputs of the tenth and the twentyseventh AND gates (199, 140) and also to a second output of the local controller for dynamic reconfiguration (IE1), and at that a first input of the twentyeighth and the twentyninth AND gates (141 and 144) are connected to a direct output of the tenth D-flip-flop (128), outputs of the twentyeighth and the twentysixth AND gates (141 and 139) together with an input of the local controller for start of receiving in the first input buffer (RCENAO) are combined into a twelfth OR gate (145), an output of which is connected via a thirtieth AND gate (146) to the output of the local synchronization controller of the first input buffer (SYNBO), outputs of the twentyseventh and twentyninth AND gates (140 and 144) are combined together with an input of the local controller for start of receiving in the second input buffer (RCENA1) into a thirteenth OR gate (147), which is connected via a thirtyfirst AND gate (148) to an output of the local synchronization controller of the second input buffer (SYNB1), and at that second inputs of the thirtieth and the thirtyfirst AND gate (146 and 148) are connected to the network clock generator (NC), an inverse output of the first D-flip-flop is connected to an input of the fourth OR gate (161), the output of which is connected via the twentysecond AND gate (119) to a data input of the twelfth D-flip-flop (136), the outputs of the second and the fourth monostable multivibrators (88 and 100) are connected respectively via a third and a fourth delay elements to synchronizing inputs of the fourth and the eighth D-flip-flop (91 and 103).

* * * * *